(12) United States Patent
Kusano

(10) Patent No.: US 12,498,890 B2
(45) Date of Patent: Dec. 16, 2025

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM Business Innovation Corp., Tokyo (JP)

(72) Inventor: Nobumi Kusano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 434 days.

(21) Appl. No.: 17/902,886

(22) Filed: Sep. 4, 2022

(65) Prior Publication Data
US 2023/0297293 A1 Sep. 21, 2023

(30) Foreign Application Priority Data
Mar. 17, 2022 (JP) .................................. 2022-042926

(51) Int. Cl.
G06F 3/12 (2006.01)
H04N 1/00 (2006.01)

(52) U.S. Cl.
CPC .......... *G06F 3/1204* (2013.01); *G06F 3/1231* (2013.01); *H04N 1/00477* (2013.01)

(58) Field of Classification Search
None
See application file for complete search history.

(56) References Cited

U.S. PATENT DOCUMENTS

| | | | |
|---|---|---|---|
| 9,232,107 B2 | 1/2016 | Nishiyama | |
| 10,922,035 B2 | 2/2021 | Muraishi | |
| 2018/0364952 A1* | 12/2018 | Ketsuka | ............... G03G 15/502 |
| 2019/0012124 A1* | 1/2019 | Muraishi | ............ H04N 1/00031 |

FOREIGN PATENT DOCUMENTS

| | | |
|---|---|---|
| JP | 2009065230 | 3/2009 |
| JP | 2012129727 | 7/2012 |
| JP | 2019016857 | 1/2019 |

* cited by examiner

*Primary Examiner* — Frantz Bataille
(74) *Attorney, Agent, or Firm* — JCIPRNET

(57) ABSTRACT

An information processing apparatus includes a processor configured to: in a case where a parameter set using external data set to be changeable by plural people is used by a user, the external data has been changed, and the user is a person involved in the change of the external data, permit use of the parameter set.

16 Claims, 5 Drawing Sheets

ADDRESS INFORMATION DATABASE

| IDENTIFIER | ADDRESS | CHANGE HISTORY ||
| --- | --- | --- | --- |
| | | DATE AND TIME | CHANGER |
| A001 | AA1@XX.com | 12/1/2021 18:12 | U101 |
| | AA2@XX.com | 12/5/2021 12:05 | U102 |
| | ⋮ | ⋮ | ⋮ |
| A002 | BB1@icloud.com | - | - |
| | ⋮ | ⋮ | ⋮ |

FIG. 5

PARAMETER SET DATABASE 13

| SET ID | PARAMETER SET | USAGE HISTORY | |
| --- | --- | --- | --- |
| | | DATE AND TIME | USER |
| PS00A | TRANSMISSION DESTINATION: A001 COLOR MODE: FULL COLOR RESOLUTION: 300dpi ⋮ | 12/3/2021 10:36 | U001 |
| | | 12/4/2021 14:48 | U002 |
| | | ⋮ | ⋮ |
| PS00B | TRANSMISSION DESTINATION: A002 COLOR MODE: FULL COLOR RESOLUTION: 400dpi ⋮ | 12/1/2021 11:23 | U012 |
| | | ⋮ | ⋮ |
| ⋮ | ⋮ | ⋮ | ⋮ |

FIG. 7

NOTIFICATION SCREEN

30

BECAUSE TRANSMISSION DESTINATION OF IMAGE
IN DESIGNATED ONE-TOUCH APPLICATION IS CHANGED
AS FOLLOWS, PLEASE BE CAREFUL.

CHANGE DATE AND TIME: 12:05 DECEMBER 05, 2021
CHANGER                : (U102)

BEFORE CHANGE       : AA1@XX.com
AFTER CHANGE        : AA2@XX.com

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2022-042926 filed Mar. 17, 2022.

BACKGROUND

(i) Technical Field

The present invention relates to an information processing apparatus, a non-transitory computer readable medium storing an information processing program, and an information processing method.

(ii) Related Art

JP2009-65230A discloses a data communication device for the purpose of avoiding erroneous transmission to a destination contrary to an intention of a user even in a case where there is a change in a communication destination.

The data communication device includes a data communication function, an address book function capable of registering information related to a communication destination, and a program function capable of registering various types of information including reference information related to the address book function. In addition, the data communication device includes a determination unit and an acquisition unit. In a case where a communication destination is changed, the determination unit determines whether or not there is a registration program that refers to a communication destination related to the change. In a case where it is determined that there is the corresponding registration program as a result of the determination of the determination unit, the acquisition unit acquires an intention of a user regarding whether or not the change related to the communication destination is reflected to the corresponding registration program. Further, the data communication device includes a decision unit that decides whether or not the change related to the communication destination is reflected to the corresponding registration program, in accordance with the intention of the user, which has been acquired by the acquisition unit.

SUMMARY

However, the technique disclosed in JP2009-65230A has no problem in a case where a user who changes data in an address book is identical to a user who uses the registration program, but, in a case where the data in the address book is shared by a plurality of people and is set to be changeable by the plurality of people, the data in the address book may be changed before the user knows. In this case, there is a problem that, in order to prevent the user from communicating with an unexpected communication destination, it is necessary to ask the user whether or not a process by the registration program can be executed.

Such a problem is not limited to the registration program that uses the data in the address book, and may occur in the overall processing related to a parameter set that uses external data.

Aspects of non-limiting embodiments of the present disclosure relate to an information processing apparatus, a non-transitory computer readable medium storing an information processing program, and an information processing method capable of executing a process using a parameter set without asking an instruction of a user even in a case where external data used by the parameter set is changed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus includes a processor configured to: in a case where a parameter set using external data set to be changeable by a plurality of people is used by a user, the external data has been changed, and the user is a person involved in the change of the external data, permit use of the parameter set.

BRIEF DESCRIPTION OF THE DRAWINGS

Exemplary embodiment(s) of the present invention will be described in detail based on the following figures, wherein:

FIG. 5 is a schematic diagram illustrating an example of a configuration of a parameter set database according to the exemplary embodiment;

FIG. 7 is a front view illustrating an example of a notification screen according to the exemplary embodiment.

DETAILED DESCRIPTION

Hereinafter, an exemplary embodiment for carrying out the present invention will be described in detail with reference to the drawings. In the present exemplary embodiment, a case where an information processing apparatus of the present invention is applied as a control unit of an image forming device will be described, but the present exemplary embodiment is not limited to this. For example, a form in which the information processing apparatus of the present invention is applied to a terminal device that performs various instructions regarding image formation to the image forming device may be made.

Figure 1:
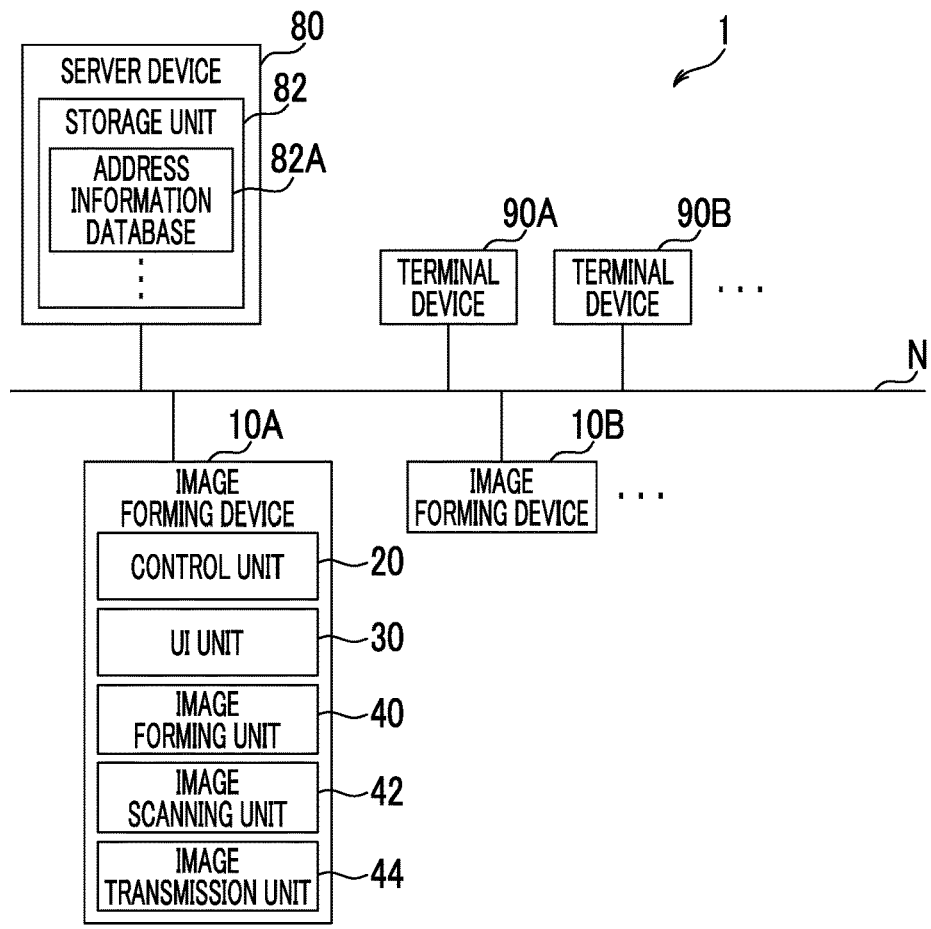
FIG. 1 is a block diagram illustrating an example of a configuration of an information processing system according to an exemplary embodiment.

First, the configuration of an information processing system 1 according to the present exemplary embodiment will be described with reference to FIG. 1. FIG. 1 is a block diagram illustrating an example of the configuration of the information processing system 1 according to the present exemplary embodiment.

As illustrated in FIG. 1, the information processing system 1 according to the present exemplary embodiment includes a plurality of image forming devices 10A, 10B, . . . , a server device 80, and a plurality of terminal devices 90A, 90B, . . . . In a case where the image forming devices 10A, 10B, . . . are described without distinguishment, the image forming devices 10A, 10B, . . . are simply collectively referred to as an "image forming device 10" below. Further, in a case where the terminal devices 90A, 90B, . . . are described without distinguishment, the terminal devices 90A, 90B, . . . are simply collectively referred to as a "terminal device 90" below.

Examples of the server device 80 include a cloud server, a server that is not in a cloud, and the like. Further, examples of the terminal device 90 include a stationary personal computer and a mobile terminal such as a smartphone, a tablet terminal, and a portable information terminal.

In the present exemplary embodiment, a digital multifunction device having an image printing function, an image scanning function, an image transmission function, and the like is applied as the image forming device 10. The present disclosure is not limited to this form. A form in which an image forming device having only an image printing function and an image scanning function or an image forming device having only an image forming function is applied as the image forming device 10 may be made.

All the image forming devices 10A, 10B, . . . are not limited to having the identical specifications. Services that can be performed may vary, items settable in the service may vary, and equipped optional items may vary.

The image forming device 10, the server 80, and the terminal device 90 are connected to each other via a network N. Each image forming device 10, the server device 80, and each terminal device 90 can communicate with each other via the network N. In the present exemplary embodiment, a public communication line such as the Internet or a telephone line network is applied as the network N, but the present disclosure is not limited to this form. For example, as the network N, communication lines in a company such as a local area network (LAN) and a wide area network (WAN) may be applied, and a combination of the communication line in the company and the public communication line may be applied. Further, in the present exemplary embodiment, a wired communication line is applied as the network N, but the present disclosure is not limited to this form. A wireless communication line may be applied, and a combination of the wired communication line and the wireless communication line may be applied.

As illustrated in FIG. 1, the image forming device 10 according to the present exemplary embodiment includes a control unit 20, a user interface (UI) unit 30, an image forming unit 40, an image scanning unit 42, and an image transmission unit 44. Therefore, in the image forming device 10 according to the present exemplary embodiment, the UI unit 30 can display and input various types of information, and the image forming unit 40 can perform printing of various images. Further, in the image forming device 10 according to the present exemplary embodiment, the image scanning unit 42 can scan an image, and the image transmission unit 44 can transmit the image.

Further, the server device 80 according to the present exemplary embodiment includes a storage unit 82, and an address information database 82A is stored in the storage unit 82. The storage unit 82 is realized by a hard disk drive (HDD), a solid state drive (SSD), a flash memory, or the like. The details of the address information database 82A will be described later.

Further, the terminal device 90 according to the present exemplary embodiment is used by a user of the information processing system 1 (simply referred to as a "user" below). As described above, a stationary computer, a mobile terminal, or the like is applied to the terminal device 90.

Figure 2:
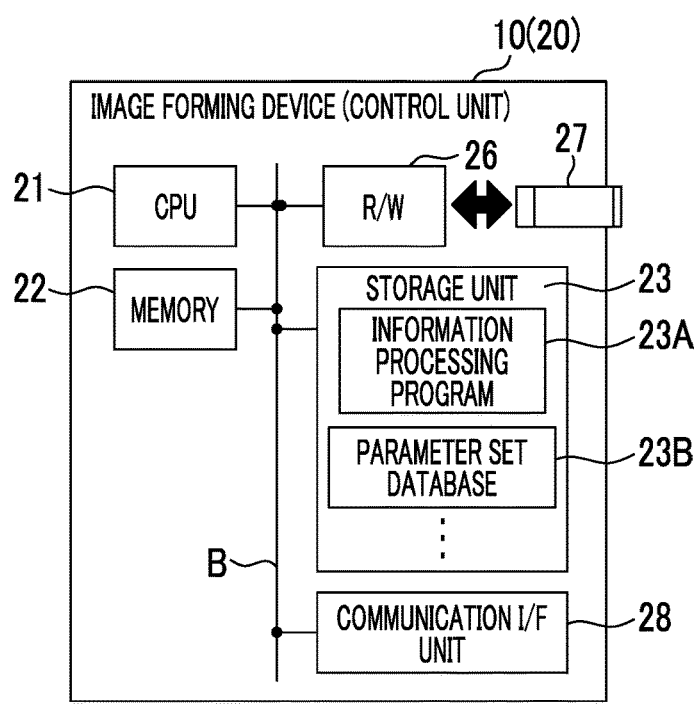
FIG. 2 is a block diagram illustrating an example of a hardware configuration of a control unit in an image forming device according to the exemplary embodiment.
Figures 3, 4:
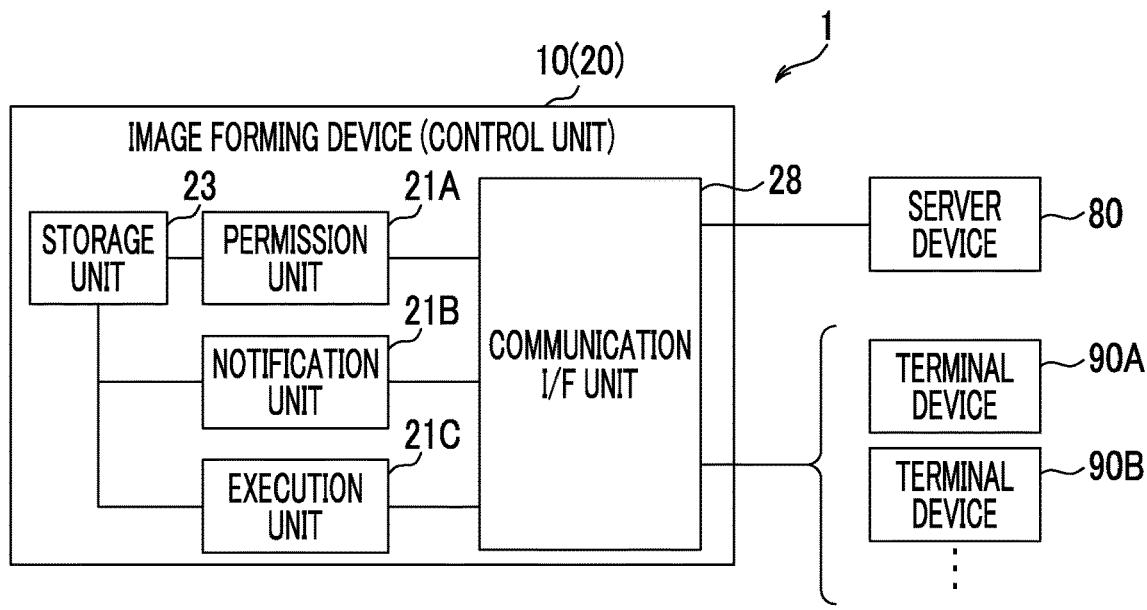
FIG. 3 is a block diagram illustrating an example of a functional configuration of the control unit in the image forming device according to the exemplary embodiment.
FIG. 4 is a schematic diagram illustrating an example of a configuration of an address information database according to the exemplary embodiment.

Next, the configuration of the control unit 20 in the image forming device 10 according to the present exemplary embodiment will be described with reference to FIGS. 2 and 3. FIG. 2 is a block diagram illustrating an example of the hardware configuration of the control unit 20 in the image forming device 10 according to the present exemplary embodiment. FIG. 3 is a block diagram illustrating an example of the functional configuration of the control unit 20 in the image forming device 10 according to the present exemplary embodiment.

As illustrated in FIG. 2, the control unit 20 in the image forming device 10 according to the present exemplary embodiment includes a central processing unit (CPU) 21 as a processor, a memory 22 as a temporary storage area, a non-volatile storage unit 23, and a medium reading and writing device (R/W) 26, and a communication interface (I/F) unit 28. The CPU 21, the memory 22, the storage unit 23, the medium reading and writing device 26, and the communication I/F unit 28 are connected to each other via a bus B. The medium reading and writing device 26 reads out information written in a recording medium 27 and writes information in the recording medium 27.

The storage unit 23 according to the present exemplary embodiment is realized by an HDD, an SSD, a flash memory, or the like. An information processing program 23A is stored in the storage unit 23 as a storage medium.

The information processing program 23A is stored (installed) in the storage unit 23 in a manner that the recording medium 27 in which the information processing program 23A has been written is connected to the medium reading and writing device 26, and the medium reading and writing device 26 reads out the information processing program 23A from the recording medium 27. The CPU 21 appropriately reads out the information processing program 23A from the storage unit 23, loads the information processing program 23A into the memory 22, and sequentially executes processes in the information processing program 23A.

Further, a parameter set database 23B is stored in the storage unit 23. The details of the parameter set database 23B will be described later.

Next, the functional configuration of the control unit 20 in the image forming device 10 according to the present exemplary embodiment will be described with reference to FIG. 3. As illustrated in FIG. 3, the control unit 20 in the image forming device 10 includes a permission unit 21A, a notification unit 21B, and an execution unit 21C. The CPU 21 of the control unit 20 in the image forming device 10 executes the information processing program 23A to function as the permission unit 21A, the notification unit 21B, and the execution unit 21C.

The permission unit 21A according to the present exemplary embodiment permits the user of a parameter set in a case where the parameter set using external data set to be changeable by a plurality of people is used by a user, the external data has been changed, and the user is a person involved in the change of the external data.

In the present exemplary embodiment, as the parameter set, a parameter set that is used in a one-touch application provided by the image forming device 10 and includes at least a parameter related to transmission of an image to an external device (terminal device 90 in the present exemplary embodiment) is applied. Further, in the present exemplary embodiment, as the external data, information (referred to as "address information" below) indicating an address book including an address corresponding to the external device in a case where the above-described transmission of the image to the external device is performed is applied. The present disclosure is not limited to this form. A form in which authentication data such as a user ID (login name) and a password stored in an authentication server is applied as the above external data, and a parameter set applied to an authentication process using the authentication data is applied as the above parameter set may be made. The "one-touch application" referred to here means an application in which a parameter set designated in a case where a result obtained in a manner that a user sets and saves, in advance, a parameter set designated in a case where a service process prepared in advance in the image forming device 10 is executed is provided as an application button for designation and execution by one-touch and means an application of executing the service process in accordance with a parameter set in advance by the designation.

Further, in the present exemplary embodiment, both a case where the user is a person who has changed the external data and a case where the user is a person who has received a notification indicating that the external data has been changed, from the notification unit 21B are applied as the case where the user is the involved person. The present disclosure is not limited to this form. For example, a form in which only one of the above two cases may be applied as the case where the user is the involved person.

In addition, the notification unit 21B according to the present exemplary embodiment performs the above notification to the user using the parameter set. In particular, the notification unit 21B according to the present exemplary embodiment performs the above notification at the time at which the user requests the use of the parameter set.

Here, in the present exemplary embodiment, as information of which the notification is performed, information including both a person who has most recently changed the external data and the date and time at which the external data has been changed is applied as the information of which the notification is performed. The present disclosure is not limited to this form. A form in which only one of the above types of information is applied as the information of which the notification is performed may be made. A form in which another type of information of external data before the change or the like is applied as the information of which the notification is performed may be made.

Further, the notification unit 21B according to the present exemplary embodiment performs the above notification in a case where the external data has been changed and the user is not a person who changed the external data. Further, the execution unit 21C according to the present exemplary embodiment executes a process of presenting difference information to the user in a case where the user uses the parameter set and the external data has been changed. The difference information indicates a difference between the external data before the change and the changed external data.

In the present exemplary embodiment, as the above notification, a notification by a display using the UI unit 30 of a target image forming device 10 is applied. The present disclosure is not limited to this. For example, a form in which a voice notification by a voice reproduction unit such as a speaker, an image formation notification by the image forming unit 40 in the image forming device 10, or the like is applied as the notification may be made.

Next, the address information database 82A stored in the server device 80 according to the present exemplary embodiment will be described with reference to FIG. 4. FIG. 4 is a schematic diagram illustrating an example of the configuration of the address information database 82A according to the present exemplary embodiment.

The address information database 82A according to the present exemplary embodiment is a database in which information related to the above-described address information is registered. As illustrated in FIG. 4 as an example, each type of information of an identifier, an address, and a change history is stored in association with each other.

The identifier is information given in advance to be different for each transmission destination, in order to individually identify the corresponding transmission destination. Further, the above-described address is information indicating an address in a case where various types of information are transmitted to the corresponding transmission destination, and is information corresponding to the above-described address information. In the present exemplary embodiment, an e-mail address of an e-mail is applied as the above address, but the present invention is not limited to this. For example, a form in which an Internet protocol (IP) address of the terminal device 90 used by the corresponding user, a media access control (MAC) address, and the like are applied as the above address may be made.

Further, the above change history is information indicating the history in a case where the corresponding address has been changed. In the present exemplary embodiment, both type of information on the date and time at which the change has been performed and the user who has performed the change are applied as the change history. The present disclosure is not limited to this. For example, a form in which only one of the two types of information is applied as the change history may be made. In the address information database 82A according to the present exemplary embodiment, it is assumed that default information (-(hyphen) in the present exemplary embodiment) is stored as information indicating the change history for an address that have not been changed in the past.

In the information processing system 1 according to the present exemplary embodiment, it is assumed that all users can change the address in the address information database 82A via the terminal device 90, but the present disclosure is not limited to this. For example, it is assumed that, in a case where each user belongs to the identical organization, some of the users, such as a person with a predetermined position or higher in the organization or a person who performs a predetermined work such as the general affairs section may be able to change the address in the address information database 82A.

Next, the parameter set database 23B stored in each image forming device 10 according to the present exemplary embodiment will be described with reference to FIG. 5. FIG. 5 is a schematic diagram illustrating an example of the configuration of the parameter set database 23B according to the present exemplary embodiment.

The parameter set database 23B according to the present exemplary embodiment is a database in which information related to the above-described parameter set is registered. As illustrated in FIG. 5 as an example, types of information of a set ID, a parameter set, and a usage history are stored in association with each other.

The set ID is information given in advance to be different for each parameter set in order to individually identify the corresponding parameter set. Further, the parameter set is information indicating the corresponding parameter set itself, and as described above, is information including external data (address information in the present exemplary embodiment).

Further, the usage history is information indicating the history of the user who has used the corresponding parameter set. In the present exemplary embodiment, both types of the information on the date and time of use and the user who has used the information are applied as the usage history, but the present disclosure is not limited to this. For example, a form in which only one of the two types of information is applied as the usage history may be made.

Figure 6:
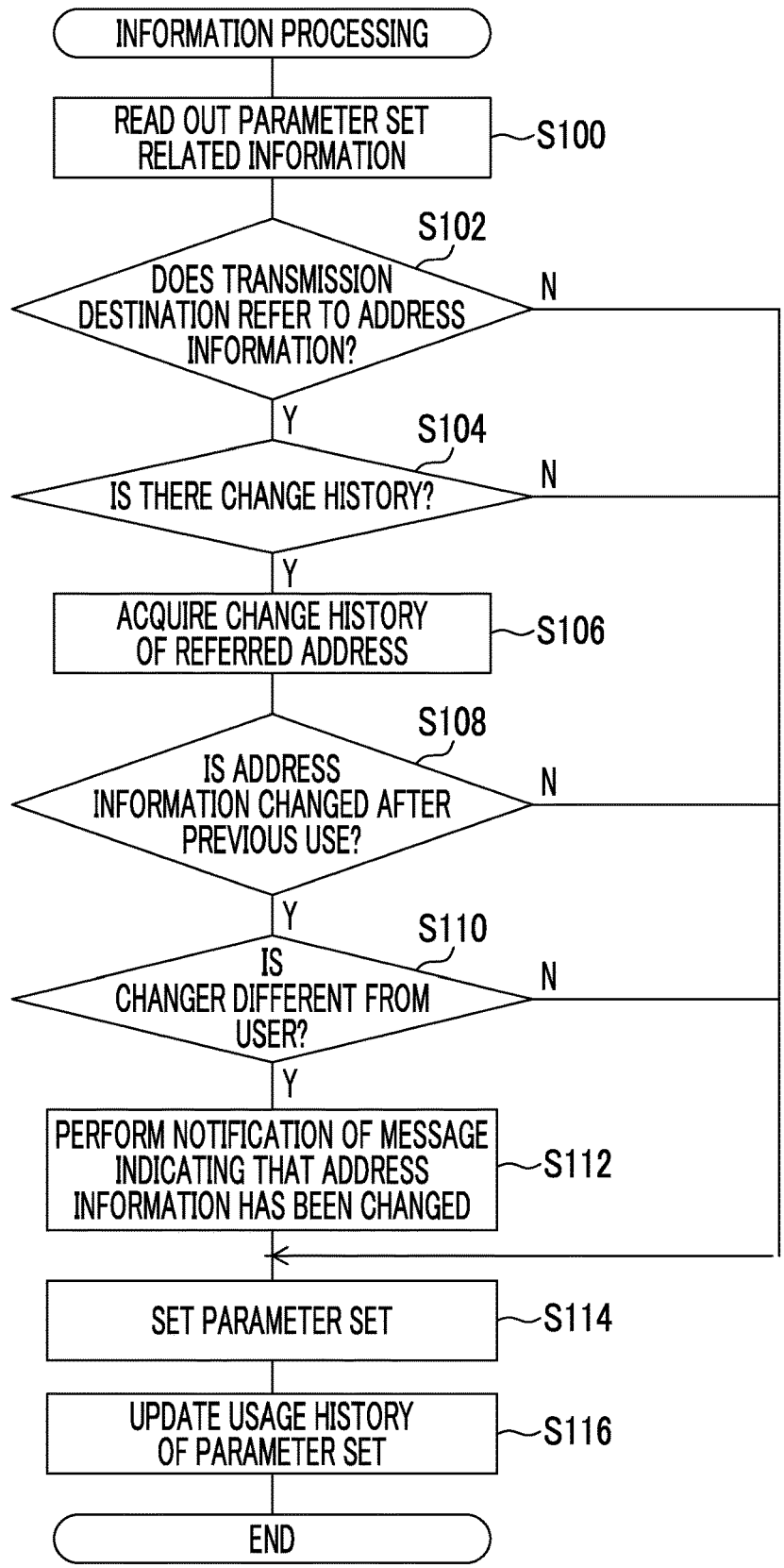
FIG. 6 is a flowchart illustrating an example of information processing according to the exemplary embodiment.

Next, the operation of the image forming device 10 in a case of performing information processing will be described as the operation of the information processing system 1 according to the present exemplary embodiment, with reference to FIGS. 6 to 7. In a case where any one-touch application registered in advance in any image forming device 10 is designated, the CPU 21 of the control unit 20 in the image forming device 10 executes the information processing program 23A, and thus the information processing according to the present exemplary embodiment is performed. FIG. 6 is a flowchart illustrating an example of the information processing according to the present exemplary embodiment. Here, in order to avoid confusion, a case where the address information database 82A and the parameter set database 23B have already been constructed will be described. Further, here, in order to avoid confusion, a case where the user is logged in to the image forming device 10 in a case using the image forming device 10, and the CPU 21 of the control unit 20 in the image forming device 10 grasps the user (referred to as a "target user" below) will be described.

In Step S100 in FIG. 6, the CPU 21 reads out a parameter set used by the one-touch application designated by the target user and each type of information of the usage history corresponding to the parameter set (referred to as "parameter set related information" below) from the parameter set database 23B. In Step S102, the CPU 21 determines whether or not the parameter set (referred to as a "target parameter set" below) in the read parameter set related information is set to refer to the address information (referred to as "target address information" below). In a case where it is determined to be positive, the process proceeds to Step S104.

In Step S104, the CPU 21 refers to the address information database 82A of the server device 80 to determine whether or not the address corresponding to the target address information has been changed. In a case where it is determined to be positive, the process proceeds to Step S106. In Step S106, the CPU 21 reads out information indicating the change history corresponding to the target address information (referred to as "target change history information" below) from the address information database 82A.

In Step S108, the CPU 21 refers to the information indicating the usage history in the parameter set related information and the target change history information to determine whether or not the target user has previously used the target parameter set, and then the address corresponding to the target address information has been changed. In a case where it is determined to be positive, the process proceeds to Step S110. In this case, the address corresponding to the target address information may be changed a plurality of times, but, in this case, the latest change is targeted.

In Step S110, the CPU 21 refers to the target change history information to determine whether or not the target user is different from a changer who has changed the address corresponding to the target address information. In a case where it is determined to be positive, the process proceeds to Step S112.

In Step S112, the CPU 21 controls the UI unit 30 to display a notification screen indicating that the address corresponding to the target address information has been changed, and then proceeds to Step S114. FIG. 7 illustrates an example of the notification screen according to the present exemplary embodiment.

As illustrated in FIG. 7, on the notification screen according to the present exemplary embodiment, a message indicating that the transmission destination of the image transmission process executed in the designated one-touch application has been changed and that the attention is drawn is displayed. Further, on the notification screen according to the present exemplary embodiment, information indicating the date and time at which the transmission destination of the image is changed and the person who changed the image is displayed. Further, on the notification screen according to the present exemplary embodiment, each type of information (corresponding to the difference information) before and after the change of the transmission destination of the image is displayed. Therefore, by referring to the notification screen, the target user can grasp whether or not the transmission destination of the image is the intended transmission destination, and also grasps the details regarding the change of the destination. As a result, the target user can appropriately take measures in a case where there is a problem in changing the transmission destination.

On the other hand, in a case where a negative determination is made in any of Steps S102, S104, S108, and S110, the process proceeds to Step S114.

In Step S114, the CPU 21 is set to apply the target parameter set to the one-touch application designated by the target user. In Step S116, the CPU 21 adds information indicating that it has been used this time (information indicating the date and time at this time and the target user) to the information indicating the usage history corresponding to the target parameter set. Then, the CPU 21 ends the present information processing. In a case where there is no problem with the changed destination, the target user who receives the notification on the notification screen directly instructs the execution of the one-touch application. On the other hand, in a case where there is a problem with the changed destination, the target user takes some measures by using the information notified by the notification screen.

In a case where there is no usage history of the parameter set by the target user after the change history of the data in the address book by the above information processing, and the user who has changed the data in the address book is a user different from the target user, by the above information processing, it is determined that the change of the data in the referenced address book is not known to the target user, and the notification by the notification screen is performed.

In a case where there is a usage history of the parameter set by the target user after the change history of the data in the address book, it means that there was a notification on the notification screen, so it is determined that the change in the data in the address book is known. Start of processing by the one-touch application is permitted without performing notification on the notification screen.

Further, even in a case where the user who has changed the data in the address book is the same as the target user, the notification is not performed on the notification screen because the target user knows that the data in the address book has been changed.

In the above exemplary embodiment, the case where the present invention is applied to a mode in which both the data of the address book and the parameter set are shared by the user has been described, but the present invention is not limited thereto. For example, although the data in the address book is shared by users, a form in which the present invention is applied to a form in which the parameter set is set to be dedicated to an individual may be made. In this case, for the information indicating the change history in the address information database 82A, it is necessary to register information on the date and time and the changer as in the above exemplary embodiment, but, for the information indicating the usage history in the parameter set database 23B, only the information on the date and time may be registered.

Further, in a case where the present invention is applied to a form in which both the address book data and the parameter set are exclusively used by the user, it is determined that the change in the address book data is known to the user. Even in a case where there is such a change, the notification screen is not performed in a case where the one-touch application is used.

Further, in the above exemplary embodiment, the case where the one-touch application is applied as the usage target of the parameter set has been described, but the present invention is not limited to this. For example, a job memory or preset registration may be used as the parameter set. The job memory referred to here is a function of registering in advance a series of operations frequently used in copying, faxing, scanning, and the like in the image forming device. Further, preset registration is a function of pre-registering settings frequently used for copying, faxing, scanning, and the like in the image forming device.

Further, in the above exemplary embodiment, the case where the transmission target to the external device is an image has been described, but the present invention is not limited to this. For example, a form in which the document is set to be transmitted to an external device may be made.

Further, in the above exemplary embodiment, the case where the address information database 82A is registered in the server device 80 has been described, but the present invention is not limited to this. For example, a form in which the address information database 82A is registered in any terminal device 90 or any image forming device 10 may be made.

Although the exemplary embodiments have been described above, the technical scope of the present invention is not limited to the scope described in the above exemplary embodiments. Various changes or improvements may be made to the above exemplary embodiments without departing from the gist of the invention, and the changed or improved modes are also included in the technical scope of the invention.

Further, the above exemplary embodiment does not limit the invention according to the claim, and not all combinations of characteristics described in the exemplary embodiments are not limited to being required for the means for addressing the invention. The above-described exemplary embodiments include inventions at various stages, and various inventions are extracted by combining a plurality of disclosed constituent requirements. Even though some constituent requirements are deleted from all the constituent requirements described in the exemplary embodiments, a configuration in which some of the constituent requirements are deleted may be extracted as an invention as long as the effect is obtained.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in the above exemplary embodiment, the case where the information processing is realized by a software configuration using a computer by executing a program has been described, but the present invention is not limited to this. For example, a form in which information processing is realized by a combination of a hardware configuration and a software configuration may be made.

In addition, the configuration of the image forming device 10 described in each exemplary embodiment are examples. An unnecessary portion may be deleted or a new portion may be added, within a range without departing from the gist of the present invention.

Further, the flow of the information processing described in each exemplary embodiment is also an example. An unnecessary step may be deleted, a new step may be added, or the processing order may be changed, within a range without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a processor configured to:
  in a case where a parameter set using external data set to be changeable by a plurality of people is used by a user, the external data has been changed, and the user is a person who has changed the external data, permit use of the parameter set; and
  in a case where the user is not the person who changed the external data, notify the user using the parameter set that the external data has been changed.

2. The information processing apparatus according to claim 1,
 wherein the case where the user is the involved person means a case where the user is a person who has received a notification indicating that the external data has been changed.

3. The information processing apparatus according to claim 2, wherein the processor is configured to:
 perform the notification to a user using the parameter set.

4. The information processing apparatus according to claim 3, wherein the processor is configured to:
 perform the notification at a time at which the user requests the use of the parameter set.

5. The information processing apparatus according to claim 1, wherein the processor is configured to:
perform the notification at a time at which the user requests the use of the parameter set.

6. The information processing apparatus according to claim 2,
wherein information of which the notification is performed includes at least one of a person who has most recently changed the external data or date and time at which the external data has been changed.

7. The information processing apparatus according to claim 3,
wherein information of which the notification is performed includes at least one of a person who has most recently changed the external data or date and time at which the external data has been changed.

8. The information processing apparatus according to claim 1,
wherein information of which the notification is performed includes at least one of a person who has most recently changed the external data or date and time at which the external data has been changed.

9. The information processing apparatus according to claim 4,
wherein information of which the notification is performed includes at least one of a person who has most recently changed the external data or date and time at which the external data has been changed.

10. The information processing apparatus according to claim 5,
wherein information of which the notification is performed includes at least one of a person who has most recently changed the external data or date and time at which the external data has been changed.

11. The information processing apparatus according to claim 2, wherein the processor is configured to:
in a case where the external data has been changed, and the user is not a person who has changed the external data, perform the notification.

12. The information processing apparatus according to claim 1,
wherein the parameter set includes a parameter set related to a process of transmitting predetermined information to an external device, and
the external data is address data indicating a transmission destination of the information to the external device.

13. The information processing apparatus according to claim 12,
wherein the predetermined information is image information.

14. The information processing apparatus according to claim 1, wherein the processor is configured to:
in a case where a user uses the parameter set and the external data has been changed, further execute a process of presenting, to the user, difference information indicating a difference between the external data before the change and the changed external data.

15. A non-transitory computer readable medium storing an information processing program causing a computer to execute a process comprising:
permitting, in a case where a parameter set using external data set to be changeable by a plurality of people is used by a user, the external data has been changed, and the user is a person who has changed the external data, use of the parameter set; and
notifying the user using the parameter set that the external data has been changed in a case where the user is not the person who changed the external data.

16. An information processing method comprising:
permitting, in a case where a parameter set using external data set to be changeable by a plurality of people is used by a user, the external data has been changed, and the user is a person who has changed the external data, use of the parameter set; and
notifying the user using the parameter set that the external data has been changed in a case where the user is not the person who changed the external data.

* * * * *